R. BARBER, Jr.
TOOL FOR USE IN TUBULATING HOLLOW GLASS ARTICLES.
APPLICATION FILED JAN. 13, 1917.

1,230,367.  Patented June 19, 1917.

Witness:  Inventor:
  Ralph Barber, Jr.
  by
  Augustus B. Stoughton
  Attorney.

UNITED STATES PATENT OFFICE.

RALPH BARBER, JR., OF MILLVILLE, NEW JERSEY, ASSIGNOR TO VICTOR DURAND, JR., OF VINELAND, NEW JERSEY, TRADING AS VINELAND FLINT GLASS WORKS.

TOOL FOR USE IN TUBULATING HOLLOW GLASS ARTICLES.

1,230,367.  Specification of Letters Patent.  Patented June 19, 1917.

Application filed January 13, 1917. Serial No. 142,197.

*To all whom it may concern:*

Be it known that I, RALPH BARBER, Jr., a citizen of the United States, residing at Millville, in the county of Cumberland and State of New Jersey, have invented a certain new and useful Tool for Use in Tubulating Hollow Glass Articles, of which the following is a specification.

In my application serially numbered 142,198, filed January 13th, 1917 I have described a process of making tubulatures, side necks, extra necks, hose connections, screw necks and the like on bottles and hollow glass articles, in which the glass article, while hot from its initial heat, has dropped upon it a drop of molten glass which softens the underlying wall of the article so that by blowing, and other manipulation as stretching and cutting, if necessary, there is produced an extension or projection which by a continuation of the blowing and while the article retains its initial heat is shaped by the assistance of a tool.

The principal object of the present invention is to provide a comparatively inexpensive, efficient and reliable tool which can be quickly and accurately applied to the extension or projection above referred to while hot from its initial heat and comparatively soft and bendable, and which can be used, in connection with blowing, for supporting and shaping the extension or projection so as to make a tubulature of any required shape.

The tool will be claimed at the end hereof but will be first described in connection with the embodiment of it chosen for illustration in the accompanying drawings in which—

Figure 1:
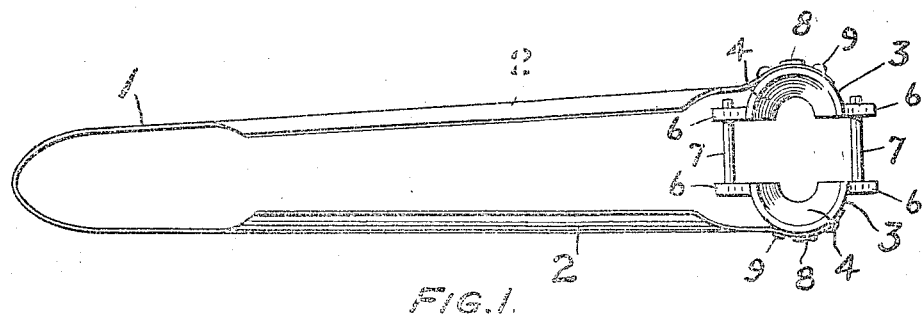
Figure 1, is a top or plan view.

In the drawings 1, are spring tongs which are normally open or distended. The shanks 2, of these tongs beyond the spring or bow are shown as rounded so as to accommodate the hand of the user. Each shank 2, is provided at its free end with a mold section or half mold 3. Each mold section has an opening 4, extending from its mold cavity 5, through its ends and ranging crosswise of the plane of the tongs. The shape of the mold cavity is the subject of a great variation and depends upon the shape desired for the finished tubulature. Each mold section is provided with lateral wings 6. 7, are guide pins connected at one end to one pair of wings and having their other ends arranged to work through openings in the other pair of wings. 8, are lugs on the mold sections that project through suitable openings in the ends of the shanks 2, and these lugs and their corresponding holes or openings may be rectangular. 9, are rivets for connecting the shanks with the molds.

Figure 2:
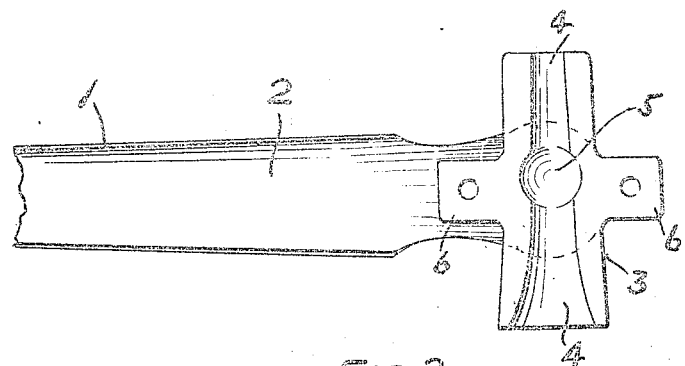
Fig. 2, is a side view, drawn to an enlarged scale and showing one mold section and a part of one shank or member of the tongs.
Figures 3, 4, 5:
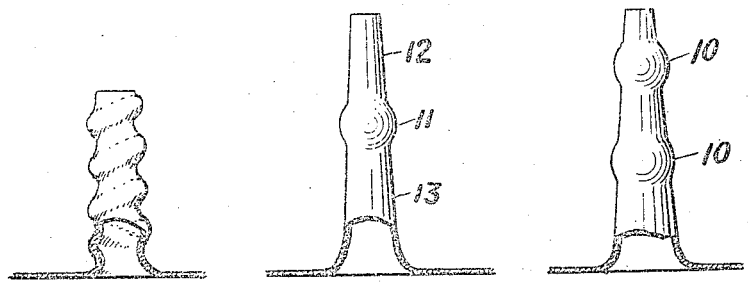
Figs. 3, 4 and 5, are views, partly in section, illustrating some, but not all, of the shapes or forms of tubulatures that can be produced by the use of the tool.

In use the article with the soft projection is usually turned so that the projection is brought upward, and inasmuch as the projection is soft, the mold sections must be applied to it quickly. The described construction and arrangement of tool permits of this for the mold sections, supported as shown in Fig. 1, can be quickly and accurately slipped over the end of the projection, then by squeezing the shanks the mold sections are brought together and to place in respect to the projection. Air or blowing on the inside of the projection causes the latter to take the shape of the mold cavity 5, while the walls of the openings 4, play their part not only in supporting but also in truing the parts of the projection which are not operated upon by the mold cavity 5. In Fig. 3, is shown a threaded tubulature. In Fig. 5, is shown a tubulature with two enlargements 10, and in Fig. 4, is shown a tubulature with one generally spherical enlargement 11, produced by the mold cavity 5, the parts 12 and 13, being supported by the openings 4, of the tool shown in Fig. 2.

What I claim is:

A tool for use in making tubulatures on hollow glass articles comprising in combination bow spring tongs, a mold having an opening through it at right angles to the plane of the tongs and consisting of two mold sections respectively attached to the shanks of the tongs and provided with ears, and guide pins coöperating with the ears, substantially as described.

RALPH BARBER, JR.